(12) United States Patent
Weiser et al.

(10) Patent No.: US 11,353,045 B2
(45) Date of Patent: Jun. 7, 2022

(54) HYDRAULIC TANK AND METHOD FOR MANUFACTURING A HYDRAULIC TANK

(71) Applicant: ARGO-HYTOS GROUP AG, Baar (CH)

(72) Inventors: Thomas Weiser, Sinsheim (DE); Daniel Trunner, Kraichtal (DE); Tanja Schleuter, Schifferstadt (DE); Jorg Stech, Bad Rappenau (DE)

(73) Assignee: ARGO-HYTOS GROUP AG, Baar (CH)

( * ) Notice: Subject to any disclaimer, the term of this patent is extended or adjusted under 35 U.S.C. 154(b) by 303 days.

(21) Appl. No.: 16/333,040

(22) PCT Filed: Sep. 22, 2016

(86) PCT No.: PCT/EP2016/072611
§ 371 (c)(1),
(2) Date: Mar. 13, 2019

(87) PCT Pub. No.: WO2018/054474
PCT Pub. Date: Mar. 29, 2018

(65) Prior Publication Data
US 2019/0226502 A1    Jul. 25, 2019

(51) Int. Cl.
*B01D 1/26* (2006.01)
*F15B 1/26* (2006.01)
(Continued)

(52) U.S. Cl.
CPC .............. *F15B 1/26* (2013.01); *B01D 27/04* (2013.01); *B01D 27/06* (2013.01); *B01D 35/027* (2013.01);
(Continued)

(58) Field of Classification Search
CPC ...... F15B 1/26; F15B 2211/615; B01D 27/06; B01D 27/04; B01D 35/0273;
(Continued)

(56) References Cited

U.S. PATENT DOCUMENTS 5,546,286 A    8/1996    Branham
6,475,380 B1   11/2002   Fangmann et al.
(Continued)

FOREIGN PATENT DOCUMENTS

CA    1087109 A    10/1980
DE    2733718 A1    2/1978
(Continued)

OTHER PUBLICATIONS

International Preliminary Report on Patentability of PCT/EP2016/072611, dated Apr. 4, 2019, with English translation, 23 pages.
(Continued)

*Primary Examiner* — Waqaas Ali
(74) *Attorney, Agent, or Firm* — Hamre, Schumann, Mueller & Larson, P.C.

(57) ABSTRACT

The invention relates to a hydraulic tank (10) for storing a hydraulic liquid, comprising a one-piece tank housing (12) which forms a plastic hollow body and is manufactured by a rotational moulding process, wherein the tank housing (12) comprises at least one connection opening (92, 94, 126) at which is arranged a connection element (100, 110, 132) that is releasably connectable to a hydraulic conduit. In order to enable the hydraulic tank to be more cost-effective to produce, the connection element (100, 110, 132) comprises a plastic body which is manufactured by an injection moulding process and is welded together with the tank housing (12). Furthermore, a method for manufacturing a hydraulic tank (10) is proposed.

16 Claims, 6 Drawing Sheets

(51) Int. Cl.

| | | |
|---|---|---|
| *B01D 35/027* | (2006.01) | |
| *B29C 69/00* | (2006.01) | |
| *B01D 35/147* | (2006.01) | |
| *E02F 9/08* | (2006.01) | |
| *B01D 35/30* | (2006.01) | |
| *B01D 27/04* | (2006.01) | |
| *B01D 27/06* | (2006.01) | |
| *B29C 45/00* | (2006.01) | |
| *B29C 65/02* | (2006.01) | |
| *B29K 77/00* | (2006.01) | |
| *B29K 309/08* | (2006.01) | |
| *B29L 31/00* | (2006.01) | |

(52) U.S. Cl.
CPC ..... *B01D 35/0273* (2013.01); *B01D 35/0276* (2013.01); *B01D 35/147* (2013.01); *B01D 35/30* (2013.01); *B01D 35/306* (2013.01); *B29C 69/00* (2013.01); *E02F 9/0883* (2013.01); *B01D 2201/291* (2013.01); *B01D 2201/295* (2013.01); *B01D 2201/30* (2013.01); *B01D 2201/301* (2013.01); *B01D 2201/302* (2013.01); *B01D 2201/303* (2013.01); *B29C 45/00* (2013.01); *B29C 65/02* (2013.01); *B29K 2077/00* (2013.01); *B29K 2309/08* (2013.01); *B29L 2031/712* (2013.01); *F15B 2211/615* (2013.01)

(58) Field of Classification Search
CPC .... B01D 35/027; B01D 35/306; B01D 35/30; B01D 35/147; B01D 35/0276; B01D 2201/291; B01D 2201/30; B01D 2201/302; B01D 2201/301; B01D 2201/303; B01D 2201/295; E02F 9/0883; B29C 69/00; B29C 45/00; B29C 65/02; B29C 41/04; B29K 2077/00; B29K 2309/08; B29L 2031/712; B60T 17/06; B60T 11/26; B29D 22/00; F16N 19/00

See application file for complete search history.

(56) References Cited

U.S. PATENT DOCUMENTS

| | | | |
|---|---|---|---|
| 6,619,310 B2 * | 9/2003 | Evanovich | B29C 41/06 |
| | | | 137/15.18 |
| 2002/0003104 A1 | 1/2002 | Evanovich et al. | |
| 2005/0155654 A1 | 7/2005 | Vulkan et al. | |
| 2006/0108800 A1 | 5/2006 | Moessinger | |
| 2011/0215093 A1 | 9/2011 | Bruck et al. | |
| 2012/0145267 A1 | 6/2012 | Haslberger | |
| 2013/0228507 A1 | 9/2013 | Schmitt et al. | |

FOREIGN PATENT DOCUMENTS

| | | | |
|---|---|---|---|
| DE | 10 2010 004650 | 7/2011 | |
| DE | 10 2010 049974 | 4/2012 | |
| DE | 10 2011 004596 | 6/2012 | |
| DE | 10 2013 222908 | 5/2015 | |
| DE | 102013222908 A1 * | 5/2015 | ............... F15B 1/26 |
| DE | 102013222908 A1 | 5/2015 | |
| EP | 1 653 141 | 5/2006 | |
| EP | 2 377 591 | 10/2011 | |
| FR | 2864910 A1 * | 7/2005 | ............ B01D 29/96 |
| RU | 2209730 C2 | 8/2003 | |
| RU | 96820 U1 | 8/2010 | |
| SU | 1590695 A1 | 9/1990 | |
| UA | 86427 C2 | 4/2009 | |
| WO | 2004/113698 | 12/2005 | |

OTHER PUBLICATIONS

Search Report issued in International Application No. PCT/EP2016/072611, dated Sep. 13, 2017, 6 pages.

Office Action issued in corresponding Russian Application No. 2019109601/03(018361), dated Mar. 2, 2020, with English translation, 9 pages provided.

Office Action issued in Russian application No. 2019109601/03 dated Oct. 9, 2019, along with the Search Report, with English translation, 14 pages.

* cited by examiner

HYDRAULIC TANK AND METHOD FOR MANUFACTURING A HYDRAULIC TANK

The invention relates to a hydraulic tank for storing a hydraulic liquid, comprising a one-piece tank housing which forms a plastic hollow body and is manufactured by a rotational moulding process and has at least one connection opening at which is arranged a connection element that is releasably connectable to a hydraulic conduit.

Furthermore, the invention relates to a method for manufacturing a hydraulic tank comprising a tank housing having at least one tank opening at which is arranged a connection element which is releasably connectable to a hydraulic conduit.

Hydraulic tanks are used in hydraulic systems for storing a hydraulic liquid. The hydraulic tanks comprise a tank housing having at least one connection opening via which the hydraulic tank can be supplied with hydraulic liquid and/or hydraulic liquid can be removed from the hydraulic tank. To this end, the at least one connection opening has arranged thereat a connection element which is releasably connectable to a hydraulic conduit.

In many cases, the hydraulic tanks are fabricated from metal, wherein a metal sheet material is welded. Such metal tanks are distinguished by a high pressure resistance and a high temperature resistance. However, where a complex geometry is required for the metal tank, a high cost is incurred in manufacturing the metal tank. Furthermore, metal tanks have drawbacks in that they are difficult to clean and have a considerable weight.

DE 10 2011 004 596 A1 proposes that a hydraulic tank be configured in the form of a plastic hollow body, wherein a tank upper part and a tank lower part are each manufactured by an injection moulding process and thereafter the two parts are assembled into a hydraulic tank. Hydraulic tanks manufactured by injection moulding can be produced at a relatively low cost per piece; however, high investment costs are incurred for providing the injection moulds.

DE 10 2010 049 974 A1 proposes a process of rotational moulding for manufacturing a tank housing of a hydraulic tank. The tank housing comprises a connection opening through which a connection element passes. A hydraulic conduit can be connected to the connection element. The connection element forms a pipe connection piece that can be screwed together with the tank housing. To this end, a metallic insert part in the form of a threaded insert is fixed in place at the connection opening. The use of insert parts or also reinforcement parts in manufacturing the tank housing by rotational moulding is associated with considerable costs.

It is an object of the present invention to provide a hydraulic tank of the kind mentioned at the outset and a method for manufacturing a hydraulic tank, wherein the hydraulic tank has an improved cost-performance ratio when considering the investment costs and the geometric configuration of the hydraulic tank.

In accordance with the invention, this object is achieved in a hydraulic tank of the generic kind in that the connection element comprises a plastic body which is manufactured by an injection moulding process and is welded together with the tank housing.

The hydraulic tank in accordance with the invention comprises a one-piece tank housing in the form of a plastic hollow body which is manufactured by a rotational moulding process. The tank housing comprises at least one connection opening for supplying and/or removing hydraulic liquid. To this end, a connection element is arranged at the least one connection opening, said connection element being releasably connectable to a hydraulic conduit and comprising a plastic body. The plastic body is manufactured by an injection moulding process and is welded together with the tank housing.

By the use of the rotational moulding process, the tank housing can be manufactured with relatively low investment cost and ample design freedom and a low per-piece cost, in particular when compared with metal tanks.

The tank housing can be manufactured by rotational moulding without a metallic partial component. It is thereby possible to dispense with cost-intensive metallic insert or reinforcement parts or other metallic components in the tank housing.

Arranged at the least one connection opening of the tank housing is a connection element which comprises a plastic body manufactured by injection moulding. The plastic body is welded together with the tank housing. The connection element can have a high dimensional accuracy and is distinguished by a high mechanical loadability. The connection element can have a hydraulic conduit connected thereto via which hydraulic liquid can be supplied to the tank housing and/or via which hydraulic liquid can be removed from the tank housing.

Overall, the hydraulic tank in accordance with the invention is distinguished by a very good cost-performance ratio, in particular for small to medium numbers of pieces, when considering the investment costs and the design options for achieving even complex geometries.

Depending on the intended application of the hydraulic tank, the tank housing can be manufactured cost-effectively with the geometry as desired in each case. The tank housing can have a desired number of connection openings as required, and the connection openings can each have arranged thereat a prefabricated connection element whose plastic body is welded together with the tank housing. The connection elements can be manufactured and stocked in large numbers of pieces in the form of modular components and can be used for different tank housings which are each manufactured by a rotational moulding process.

Preferably, the plastic body of the at least one connection element is manufactured by injection moulding as a one-piece component. Such a configuration eliminates the need to assemble the plastic body from a plurality of constituent parts. This allows a further reduction in costs.

It is advantageous for the complete connection element to be configured as a plastic body manufactured by injection moulding without a metallic partial component. With such a configuration, the connection element in particular has no metallic insert or reinforcement part and is therefore cost-effective to produce in its entirety by injection moulding.

Welding together the plastic body of the at least one connection element and the tank housing is advantageously realized by use of a laser beam.

Provision may be made for at least one first connection opening of the tank housing to form a tank inlet opening and for at least one second connection opening of the tank housing to form a tank outlet opening. Arranged at the at least one tank inlet opening and the at least one tank outlet opening is in each case a connection element which is releasably connectable to a hydraulic conduit and whose plastic body is welded together with the tank housing. Via the at least one tank inlet opening and the connection element arranged at the tank inlet opening and welded together with the tank housing, the tank housing can have hydraulic liquid supplied thereto, and via the at least one tank outlet opening and the connection element arranged at the tank outlet opening and welded together with the tank housing, the tank housing can have hydraulic liquid removed therefrom. The connection elements can be of identical configuration. In particular, the connection elements can be manufactured by injection moulding as one-piece plastic bodies, preferably without metallic partial components.

In an advantageous embodiment of the invention, the tank housing is manufactured by rotational moulding from a polyamide material.

In a preferred embodiment, the tank housing is manufactured by rotational moulding from a fibre-reinforced polyamide material, in particular a glass fibre reinforced polyamide material.

The plastic body of the connection element is preferably manufactured by injection moulding from a fibre-reinforced plastic material. In particular, provision may be made for the plastic body to be manufactured from a fibre-reinforced polyamide material, for example a glass fibre reinforced polyamide material.

It is advantageous for the connection element to form a pipe connection piece which forms, on the outer side thereof, a receiving structure for a quick-action coupling part releasably connectable to a hydraulic conduit. Such quick-action coupling parts are known to the skilled person from EP 1 653 141 A1. They provide a very simple way of connecting, in a liquid-tight manner, a hydraulic conduit to the connection element without the use of a special tool. For example, the receiving structure can form a plurality of annular grooves arranged in spaced relation to each other relative to the longitudinal axis of the pipe connection piece, said annular grooves surrounding the pipe connection piece in a circumferential direction. A quick-action coupling part releasably connectable to the pipe connection piece can be placed onto the pipe connection piece in an axial direction relative to the longitudinal axis of the pipe connection piece, wherein the quick-action coupling part comprises an outer pipe piece and an inner pipe piece oriented coaxially therewith. The outer pipe piece can be plugged onto the pipe connection piece of the connection element, wherein the inner pipe piece extends into the pipe connection piece with a seal ring interposed therebetween, which seal ring comes into contact against an end face of the pipe connection piece. For axial fixing of the quick-action coupling part in place on the pipe connection piece, a securing sleeve can be used which is elastically spreadable and placeable onto the outer pipe piece in a direction transverse to the longitudinal axis of the pipe connection piece and which comprises, on the inner side thereof, a locking element. When the securing sleeve is placed onto the outer pipe piece, the locking element passes through a through-hole of the outer pipe piece and extends into one of the annular grooves of the pipe connection piece. On the side facing away from the outer and inner pipe piece, the quick-action coupling part comprises a connection nipple to which can be connected a hydraulic conduit, for example a hydraulic hose.

The use of a connection element that forms a pipe connection piece having a receiving structure arranged on the exterior thereof makes it possible for the connection element to be releasably connected to a hydraulic conduit without having to use a special tool and without subjecting the connection element to a high mechanical load, in particular a high torque.

It is particularly advantageous for the tank housing to have a filter system integrated therein. The filter system can be configured as, for example, a suction filter, a return filter or also as a return suction filter.

In a particularly preferred configuration of the invention, the tank housing comprises a filter access opening which is surrounded by an edge section of the tank housing, wherein fixed in place at the edge section is a for example bowl-shaped filter housing inserted in the tank housing via the filter access opening, said filter housing being manufactured as a plastic body by an injection moulding process. Such a configuration provides an advantageous way of integrating a filter system in the tank housing by inserting a filter housing via a filter access opening into the tank housing and fixing it in place thereto. The filter housing can have a filter element inserted thereinto for filtering the hydraulic liquid. The filter housing is manufactured as a plastic body by an injection moulding process.

Preferably, the filter housing is manufactured by injection moulding as a one-piece plastic body.

A fibre-reinforced, in particular a glass fibre reinforced, plastic material can be used for manufacturing the filter housing. The filter housing can be inserted into the tank housing via the filter access opening and can then be fixed in place to an edge section of the tank housing surrounding the filter access opening.

The edge section surrounding the filter access opening is preferably configured as a support ring arranged in the tank housing. The support ring can be arranged at an internal wall extending into the tank housing.

In an advantageous embodiment of the invention, the filter housing is welded together with the edge section surrounding the filter access opening. The filter housing not only has the function of receiving a filter element, but, by reason of the welding operation, the filter housing also increases the mechanical stability of the tank housing in the area of the filter access opening.

After a filter element has been inserted in the filter housing, the filter access opening can be closed by way of a lid. Advantageously, the lid is screwably connectable to the tank housing.

In an advantageous embodiment of the invention, the filter housing is formed from a fibre-reinforced polyamide material, in particular a glass fibre reinforced polyamide material.

It is advantageous for the tank housing to form a filter head part on which is arranged at least one connection opening and which comprises the edge section surrounding the filter access opening.

In an advantageous embodiment of the invention, the filter head part has arranged thereat at least one first connection opening in the form of a tank inlet opening and at least one second connection opening in the form of a tank outlet opening. Arranged at the at least one tank inlet opening and the at least one tank outlet opening is in each case a connection element which, as has already been explained above, comprises a plastic body manufactured by injection moulding and is welded together with the filter head part. In particular, provision may be made for the connection elements to be in each case configured as one-piece plastic bodies manufactured by an injection moulding process.

In an advantageous embodiment of the invention, the filter element insertable into the filter housing comprises an upper and a lower end disk which receive between them a hollow-cylindrically shaped filter medium, wherein the upper end disk divides an interior space of the filter head part into an inlet space for hydraulic liquid that is to be filtered and an outlet space for hydraulic liquid that has been filtered, wherein the at least one tank inlet opening arranged at the filter head part is open to the inlet space and wherein the at least one tank outlet opening arranged at the filter head part is open to the outlet space. In such a configuration, the upper end disk of the filter element insertable into the filter housing divides the interior space of the filter head part into an inlet space and an outlet space. The inlet space is in flow communication with at least one tank inlet opening arranged at the filter head part and the outlet space is in flow communication with at least one tank outlet opening arranged at the filter head part. Hydraulic liquid can pass from the inlet space through the filter medium of the filter element to the outlet space, whereby it is filtered as it passes through the filter medium. The filter head part can have a relatively simple geometry; it can have a cylindrically shaped configuration for example. The filter head part forms part of the tank housing which is manufactured by a rotational moulding process. The necessary liquid-tight separation of the inlet space from the outlet space is realized by the upper end disk of the filter element.

In an advantageous embodiment of the invention, the upper end disk of the filter element forms a partition disk oriented obliquely to the longitudinal axis of the filter element, said partition disk being in liquid-tight contact against an inner side of the filter head part. An edge of the partition disk extending all around and in contact against the inner side of the filter head part can be configured in the form of a sealing lip for example.

In cases where at least one tank inlet opening and at least one tank outlet opening are arranged at the filter head part, it is advantageous for the at least one tank inlet opening and the at least one tank outlet opening to be arranged at the same level relative to a longitudinal axis of the filter element, in consideration of affording as compact a configuration of the hydraulic tank as possible.

In an advantageous embodiment of the invention, the filter housing forms, at its end section extending into the tank housing, a receiving space for an inlet valve and/or an outlet valve. The outlet valve allows filtered hydraulic liquid to flow out of the filter housing into the interior space of the tank housing, and the inlet valve allows hydraulic liquid to be removed from the interior space of the tank housing, wherein the hydraulic liquid then passes via the filter housing to the tank outlet opening arranged at the filter head part.

Furthermore, the receiving space may have a strainer element arranged therein. The strainer element allows coarse impurities to be retained.

Provision may be made for the filter housing to comprise, at its end section extending into the tank housing, a support wall having an outlet opening which is closeable by an outlet valve element of the outlet valve resiliently biased towards the outlet opening, wherein the outlet valve element has an inlet opening which is closeable by an inlet valve element of the inlet valve. If an amount of hydraulic liquid flowing into the filter housing via at least one tank inlet opening arranged at the filter head part is larger than that flowing out of the filter housing via at least one tank outlet opening arranged at the filter head part, then a positive pressure can occur in the filter housing. When the pressure of the hydraulic liquid prevailing in the filter housing exceeds a predetermined maximum value which may be for example 0.2 bar or 0.3 bar, the outlet valve opens by the outlet valve element lifting off the outlet opening of the filter housing against the action of the resilient return force acting thereupon so that hydraulic liquid can flow, via the outlet opening, out of the filter housing and into the interior space of the tank housing. If an amount of hydraulic liquid drawn off the filter housing via the at least one tank outlet opening arranged at the filter head part is larger than that flowing into the filter housing via the at least one tank inlet opening arranged at the filter head part, then a negative pressure can occur in the filter housing under the action of which the inlet valve element lifts off the inlet opening, thus opening the inlet opening so that hydraulic liquid can, via the inlet opening, flow from the interior space of the tank housing into the filter housing.

It is advantageous for the filter element to be supported on an end section of the filter housing extending into the tank housing. In such a configuration, the mechanical load acting upon the filter element in an axial direction as hydraulic liquid flows therethrough is absorbed by the filter housing which is preferably welded together with the tank housing.

In order to increase the mechanical stability of the tank housing, the tank housing in an advantageous configuration of the invention forms at least one traverse that extends from a first tank housing wall to an opposite second tank housing wall and is of hollow configuration. The at least one traverse passes through the interior space of the tank housing and forms a one-piece mechanical connection between two tank housing walls lying opposite one another. This imparts a particularly high mechanical stability to the tank housing.

Advantageously, the tank housing forms a ventilation opening at which a ventilation filter is arranged. Preferably, a bidirectional valve is integrated in the ventilation filter. The ventilation filter and integrated valve allow air to escape from the tank housing during filling of the hydraulic tank as soon as a predetermined maximum pressure is exceeded in the hydraulic tank, and the ventilation filter and integrated valve allow air to be admitted to the tank housing during the removal of hydraulic liquid. The inflowing air is filtered by way of the ventilation filter.

Preferably, a pipe piece extending into the tank housing is held at at least one connection opening of the tank housing. Preferably, the pipe piece passes through the connection opening.

It is advantageous for the pipe piece to be aligned in line with a connection element that is arranged at the connection opening and welded together with the tank housing. The hydraulic tank can be filled with liquid via the pipe piece. Alternatively or in addition, provision may be made for hydraulic liquid to be removed from the tank housing via the pipe piece. The pipe piece can thus form a return conduit via which hydraulic liquid flows into the tank housing or also a suction conduit via which hydraulic liquid can be removed from the tank housing. In both cases, it is possible to realize a flow-enhancing configuration.

Preferably, a pipe piece is held at a plurality of connection openings of the tank housing which are arranged in a distributed relation across the tank housing, said pipe piece extending into the tank housing and allowing the removal and/or the supply of hydraulic liquid.

In an advantageous configuration of the hydraulic tank in accordance with the invention, a portion of the pipe piece arranged inside the tank housing is configured as a protective strainer, in particular as a protective strainer of a cylindrical or frusto-conical shape.

It is advantageous for the pipe piece to be welded together with the tank housing.

Provision may be made for a connection opening of the tank housing to form a step against which a pipe piece extending into the tank housing is in contact with a radial enlargement thereof. The pipe piece can be welded together with the tank housing in the area of the radial enlargement.

Advantageously, the pipe piece is manufactured by an injection moulding process. Preferably, the pipe piece is manufactured from a fibre-reinforced plastic material, in particular a glass fibre reinforced plastic material. For example, provision may be made for the pipe piece to be made of a fibre-reinforced, in particular glass fibre reinforced, polyamide material.

Alternatively or in addition, provision may be made for at least one pipe piece to be made of metal.

As has already been mentioned, the invention further relates to a method for manufacturing a hydraulic tank, in particular a hydraulic tank in accordance with the invention, as it has been described in the foregoing. The hydraulic tank comprises a tank housing having at least one connection opening at which is arranged a connection element which is releasably connectable to a hydraulic conduit. In order to make the hydraulic tank more cost-effective to produce, the method in accordance with the invention comprises the following steps of:

manufacturing the tank housing as a one-piece plastic hollow body by a rotational moulding process;
providing the connection element with a plastic body that is manufactured by an injection moulding process;
welding the plastic body together with the tank housing in the area of the connection opening.

In accordance with the invention, the tank housing is cost-effectively manufactured by a rotational moulding process as a one-piece plastic hollow body, wherein the tank housing comprises at least one connection opening, for example a tank inlet opening and/or a tank outlet opening. In the area of the connection opening, the tank housing is welded together with the plastic body of a prefabricated connection element, wherein said plastic body is manufactured by an injection moulding process.

The tank housing can be manufactured by rotational moulding without the use of metallic partial components, i.e. in particular without metallic insert or reinforcement parts.

Preferably, the plastic body of the connection element is manufactured by injection moulding as a one-piece plastic body.

It is advantageous for the complete connection element to be manufactured by injection moulding as a plastic body without a metallic partial component. With such a configuration of the method in accordance with the invention, the connection element is in particular manufactured by an injection moulding process without metallic insert or reinforcement parts. This reduces the cost of producing the connection element.

Preferably, the complete connection element is manufactured by injection moulding as a one-piece plastic body.

Advantageously, the plastic body of the connection element is welded together with the tank housing by use of a laser beam.

In an advantageous embodiment of the method in accordance with the invention, a filter system is integrated into the tank housing.

For integrating a filter system, the tank housing in a preferred configuration of the method in accordance with the invention is configured by rotational moulding with a filter head part which comprises at least one connection opening, for example at least one tank inlet opening and/or at least one tank outlet opening, and which surrounds a filter access opening, and a for example bowl-shaped filter housing is manufactured as a plastic body of preferably one-piece configuration by an injection moulding process, inserted into the tank housing via the filter access opening and fixed in place at an edge section of the filter head part surrounding the filter access opening, and a filter element is inserted into the filter housing. Thus, the tank housing has inserted thereinto a filter housing which in turn has a filter element inserted thereinto for filtering the hydraulic liquid. The filter housing is configured as a modular component which is manufactured by an injection moulding process. The filter housing as well as the connection elements employed can be cost-effectively manufactured in large numbers of pieces and can be used for a wide variety of tank housings.

Preferably, the filter housing inserted in the tank housing via the filter access opening is welded together with the edge section surrounding the filter access opening, advantageously by use of a laser beam. Welding the filter housing together with the edge section allows the absorption of axial forces that act upon the filter element positioned in the filter housing during passage of the hydraulic liquid therethrough.

The following description of an advantageous embodiment of the invention, taken in conjunction with the drawing, serves to explain the invention in greater detail. In the drawing.

The drawing is a schematic representation of an advantageous embodiment of a hydraulic tank in accordance with the invention, designated generally by the reference numeral 10. The hydraulic tank 10 comprises a tank housing 12 which is manufactured by a rotational moulding process as a one-piece plastic hollow body from a polyamide material, preferably a fibre-reinforced polyamide material. In the embodiment shown, the tank housing 12 has a substantially cuboid configuration and comprises a bottom wall 14, a top wall 16, a rear wall 18, a front wall 20 and a first side wall 22 and a second side wall 24 which surround an interior space 26 of the tank housing.

Integrated in the tank housing 12 is a filter system 27, as described in more detail below, which in the illustrated embodiment forms a return suction filter. Alternatively, the filter system 27 could also be configured as a return filter or as a suction filter. Such filter configurations are per se known to the person skilled in the art.

For integrating the filter system 27 in the tank housing 12, the top wall 16 in the embodiment shown forms a double-walled, substantially cylindrical filter head part 28 having an external wall 30 oriented upwardly in the direction facing away from the bottom wall 14 in the manner of a collar and having an internal wall 32 extending into the interior space 26, said internal wall 32 forming at its end extending into the interior space 26 a radially inwardly directed support ring 34. The filter head part 28 surrounds a filter access opening 36 and can be closed in a liquid-tight manner by way of a lid 38 with a seal ring 40 interposed between these. To this end, the lid 38 comprises an external thread that can be threaded into a complementarily configured internal thread of the internal wall 32.

Via the filter access opening 36, a bowl-shaped filter housing 46 is inserted in the interior space 26 of the tank housing 12, wherein the filter housing 46 is supported on the support ring 34 of the filter head part 28 by way of a support flange 47. The support ring 34 forms an edge section of the tank housing 12 that surrounds the filter access opening 36 in a circumferential direction.

The filter housing 46 is manufactured by an injection moulding process from a fibre-reinforced polyamide material and is welded to the tank housing 12 in the area of the support ring 34 by way of a laser beam. In the exemplary embodiment shown, the filter housing 46 is manufactured by injection moulding as a one-piece plastic body.

At its end section 48 extending into the tank housing 12, the filter housing 46 forms a receiving space 50 which receives an outlet valve 52 and an inlet valve 54. The outlet valve 52 and the inlet valve 54 are inserted into the receiving space 50 prior to the filter housing 46 being inserted into the tank housing 12 and welded together therewith.

Figure 1:
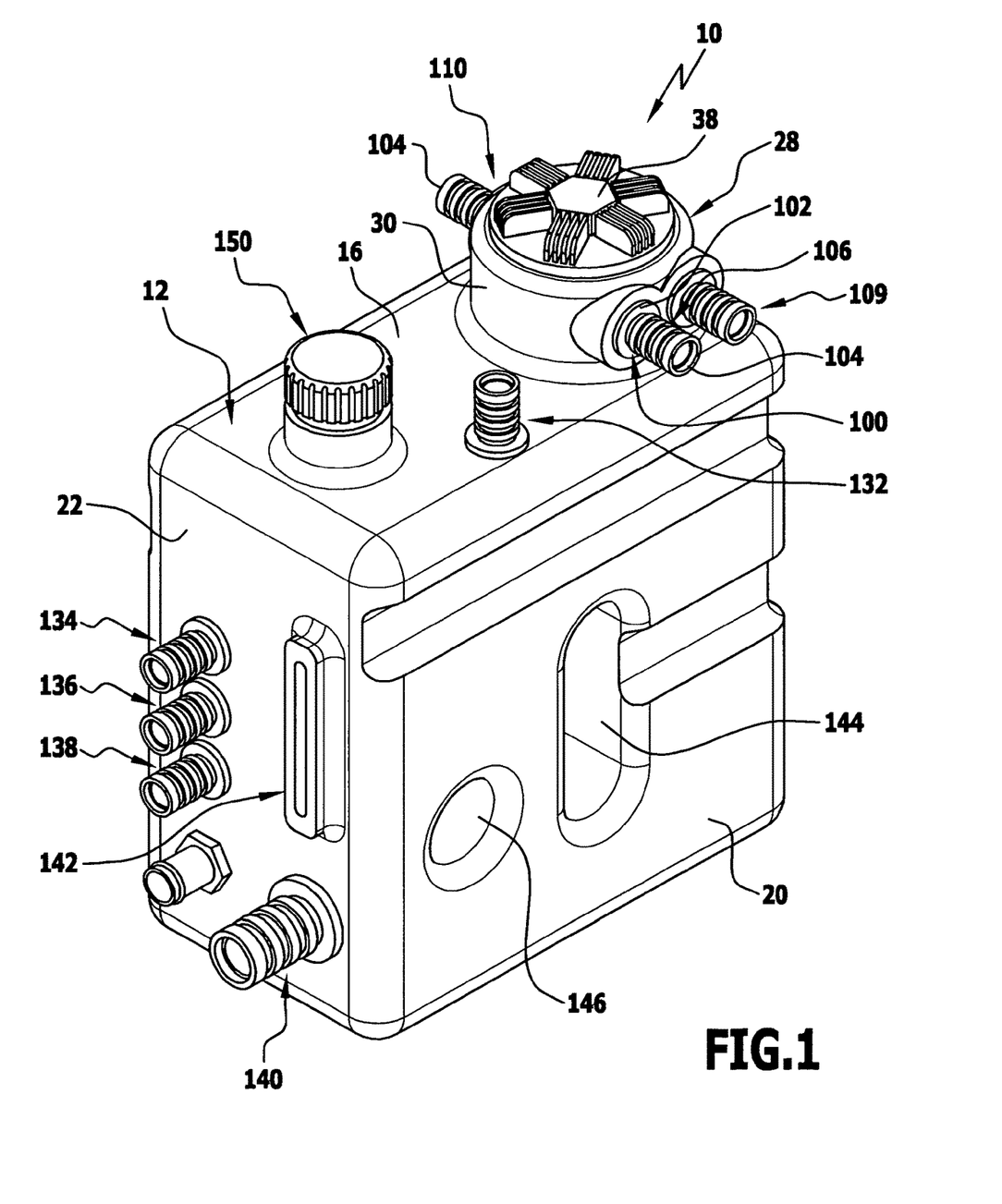
FIG. 1 shows a perspective representation of a hydraulic tank.
Figure 2:
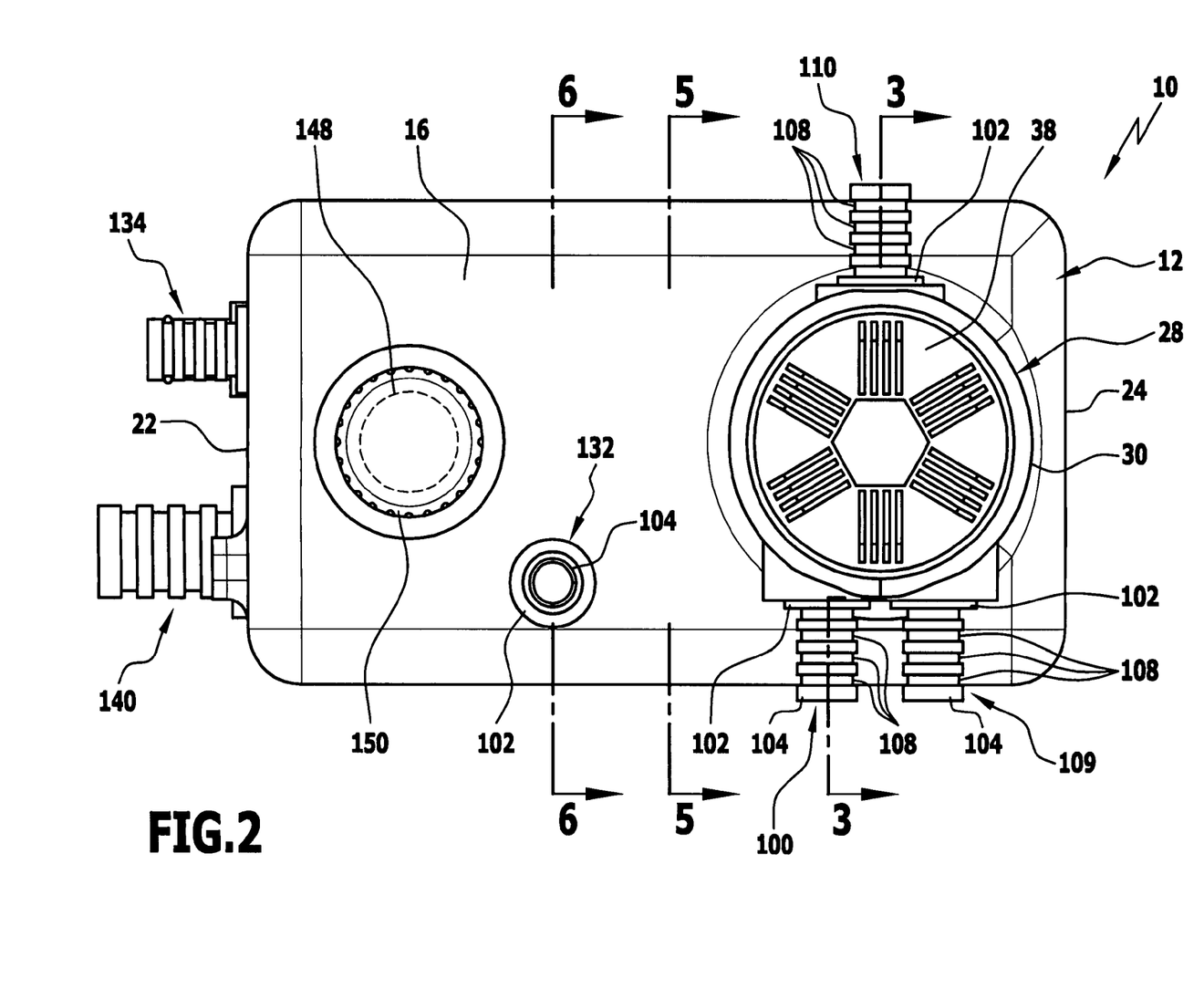
FIG. 2 shows a top view of the hydraulic tank of FIG. 1.
Figure 3:
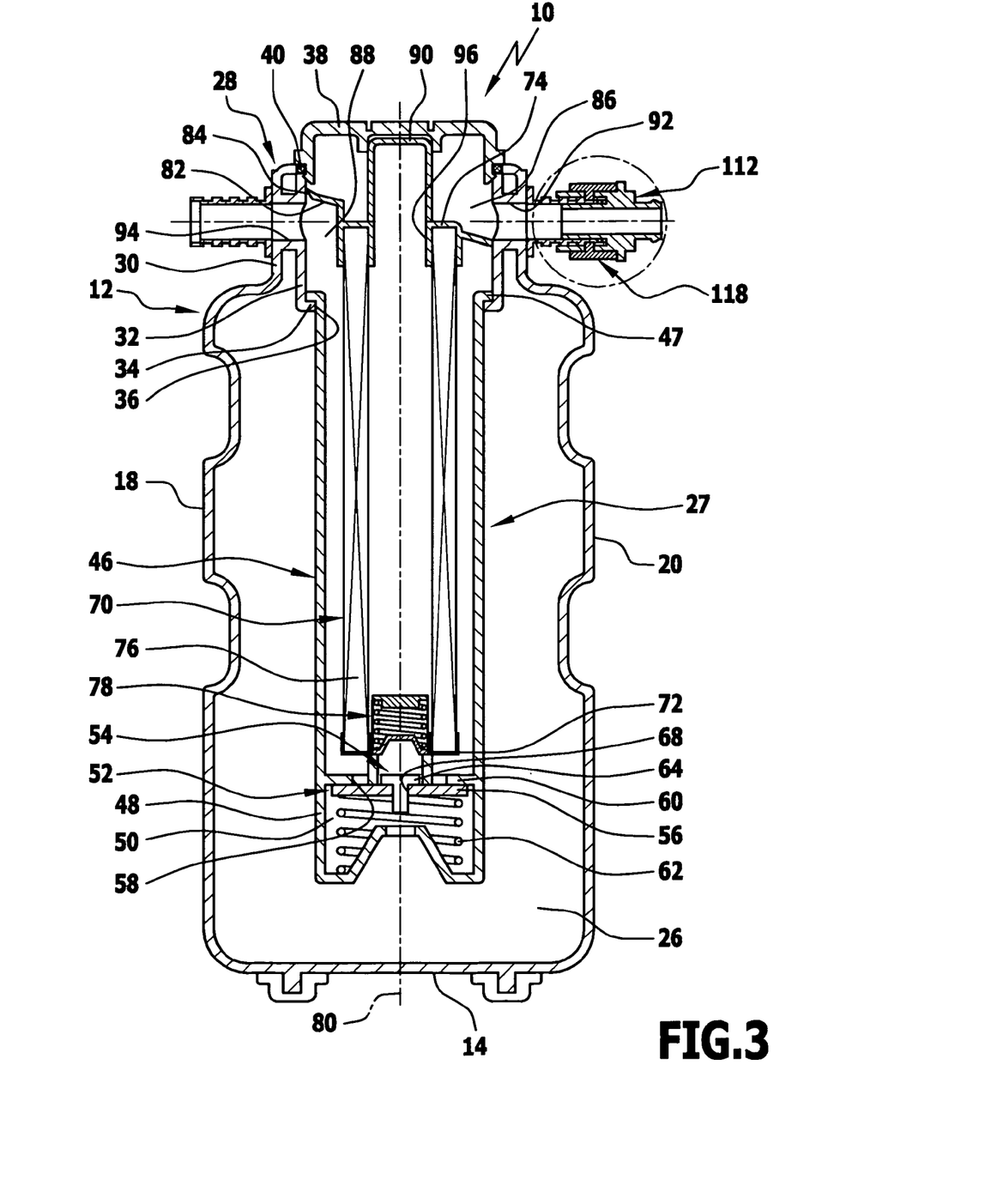
FIG. 3 shows a sectional view of the hydraulic tank along line 3-3 of FIG. 2.
Figure 4:
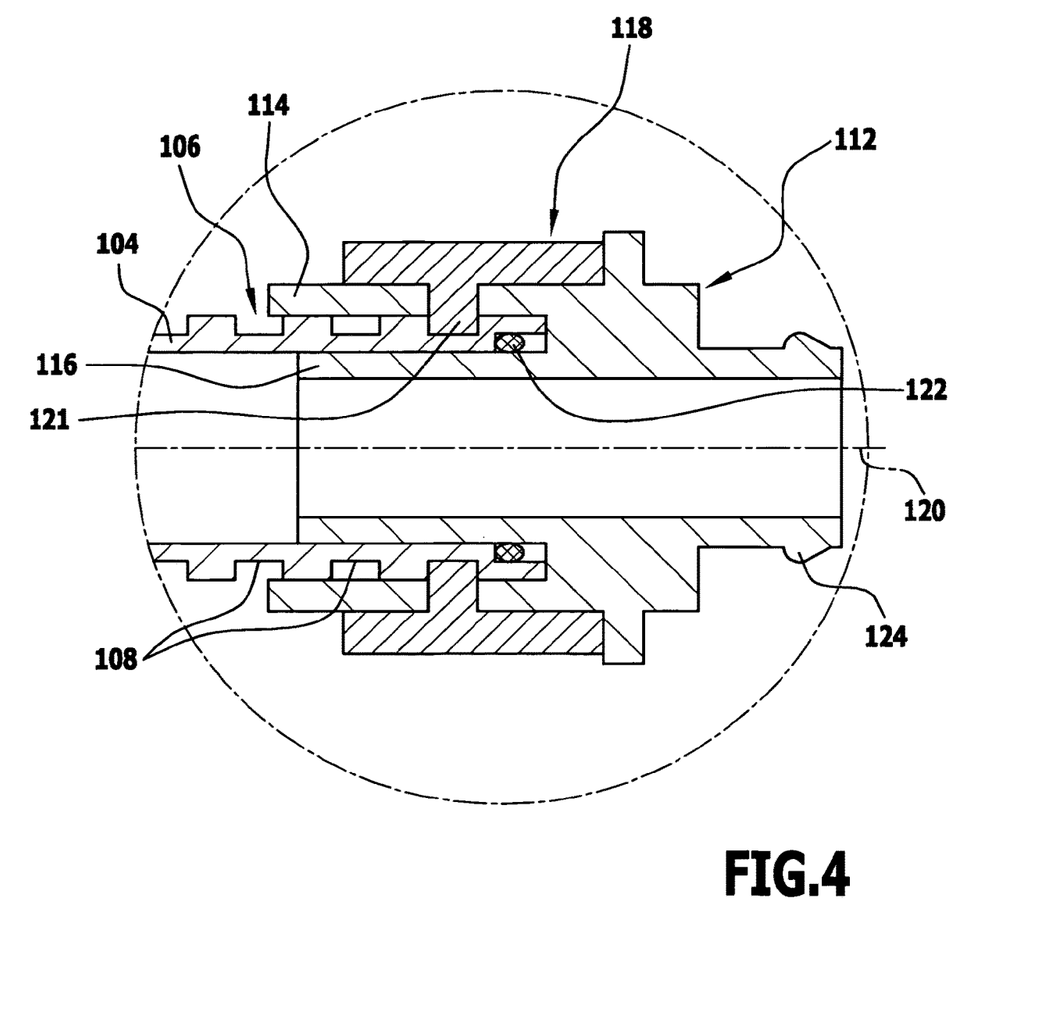
FIG. 4 shows an enlarged representation of detail A of FIG. 3.

The outlet valve 52 comprises an outlet valve element 56 which in the closed position as shown in FIG. 3 closes off an outlet opening 58 in a liquid-tight manner. The outlet opening 58 is arranged at a support wall 60 of the filter housing 46. The outlet valve element 56 is biased against an edge of the outlet opening 58 by way of a return spring 62.

The inlet valve 54 comprises an inlet valve element 64 which in the closed position as shown in FIG. 3 closes off a central inlet opening 68 of the outlet valve element 56.

If a predetermined positive pressure of for example 0.3 bar is developed inside the filter housing 46, the outlet valve element 56 lifts off the outlet opening 58 against the action of the resilient return force of the return spring 62, thereby opening a flow path via which hydraulic liquid residing in the filter housing 46 is allowed to flow through the outlet opening 58 out of the filter housing 46 and into the interior space 26. If a negative pressure is developed inside the filter housing 46, the inlet valve element 64 lifts off the inlet opening 68 so that hydraulic liquid is allowed to flow from the interior space 26 via the inlet opening 68 into the filter housing 46.

A filter element 70 is inserted in the filter housing 46 via the filter access opening 36, said filter element 70 comprising a lower end disk 72 and an upper end disk 74 and a filter medium 76 which is arranged between the lower end disk 72 and the upper end disk 74 and which, in the illustrated embodiment, is pleated into a star-shaped configuration. The filter medium 76 forms a hollow cylinder. A bypass valve 78 is arranged at the lower end disk 72.

The upper end disk 74 forms a partition disk 82 oriented obliquely to the longitudinal axis 80 of the filter element 70, said partition disk 82 being configured, at the circumferential edge thereof, as a sealing lip 84. The sealing lip 84 is in liquid-tight contact against the inner side of the internal wall 32 of the filter head part 28 and divides the interior space of the filter head part 28 surrounded by the internal wall 32 into an inlet space 86 arranged above the partition disk 82 and an outlet space 88 arranged below the partition disk 82. A retainer bracket 90 is integrally formed on the upper end disk 74 and extends all the way to the lid 38, against which the retainer bracket 90 is in contact. The filter element 70 is supported on the one hand on the support wall 60 of the filter housing 46 and on the other hand on the lid 38.

The tank housing 12 comprises a plurality of connection openings, wherein a first connection opening forms a tank inlet opening 92 arranged at the filter head part 28, said tank inlet opening 92 being open to the inlet space 86, and wherein a second connection opening forms a tank outlet opening 94 arranged at the filter head part 28, said tank outlet opening 94 being open to the outlet space 88. Furthermore, still another connection opening is arranged at the filter head part 28, said connection opening also forming a tank inlet opening and not being shown in the drawing. The tank inlet openings and the tank outlet opening 94 are arranged at the same level relative to the longitudinal axis 80 of the filter element 70.

Hydraulic liquid can flow into the inlet space 86 via the tank inlet openings. The inflowing hydraulic liquid reaches the filter medium 76 via a central through-hole 96 of the upper end disk 74 and is allowed to flow through the filter medium 76 radially from the inside to the outside, whereby the hydraulic liquid is filtered. The filtered hydraulic liquid can then be removed from the tank housing 12 via the outlet space 88 and the tank outlet opening 94. If the pressure of the filtered hydraulic liquid inside the filter housing 46 exceeds the maximum pressure of for example 0.3 bar that has already been mentioned above, the outlet valve 52 opens and the filtered hydraulic liquid can reach the interior space 26 of the tank housing 12 via the outlet opening 58. If a negative pressure develops in the filter housing 46, the hydraulic liquid can pass from the interior space 26 of the tank housing 12 through the inlet opening 68 to the outlet space 88 and exit the tank housing 12 through the tank outlet opening 94.

Arranged on the outer side of the tank housing 12, at the tank inlet opening 92, is a first connection element 100 which forms a prefabricated modular component and preferably is manufactured in its entirety as a plastic body by an injection moulding process. In the exemplary embodiment shown, the first connection element is manufactured as a one-piece plastic body without a metallic partial component. The connection element 100 comprises a connection flange 102 that is welded together with the tank housing 12 using a laser. Adjoining the connection flange 102 is a pipe connection piece 104 of the first connection element 100 which projects outwardly from the tank housing 12 and forms, on its outer side, a receiving structure 106 which in the exemplary embodiment shown is configured in the form of a plurality of annular grooves 108 surrounding the pipe connection piece 104 in a circumferential direction. A further connection element 109 is arranged on the further tank inlet opening not shown in the drawing and is of identical configuration to that of the first connection element 100.

A second connection element 110 is also configured identically to the first connection element 100 and is arranged at the tank outlet opening 94. In the exemplary embodiment shown, the second connection element 110 is also manufactured as a one-piece plastic body without a metallic partial component by an injection moulding process and welded together with the tank housing 12 using a laser beam.

The first connection element 100 and the second connection element 110 and the further connection element 109 are releasably connectable to a quick-action coupling part 112 without the use of a special tool. The quick-action coupling part 112 comprises an outer pipe piece 114 and an inner pipe piece 116 oriented coaxially therewith. The quick-action coupling part 112 is connectable to the connection element 100 or 110 by way of an elastically spreadable securing sleeve 118. The quick-action coupling part 112 forms a one-piece, shaped plastic part.

In FIG. 3, the quick-action coupling part 112 is shown as plugged on the pipe connection piece 104 of the first connection element 100, wherein the inner pipe piece 116 extends into the pipe connection piece 104 and the outer pipe piece 114 surrounds the pipe connection piece 104. After placement of the outer pipe piece 114 onto the pipe connection piece 104, the elastically spreadable securing sleeve 118 can be placed onto the outer pipe piece 114 in an assembly direction oriented perpendicularly to the longitudinal direction 120 of the pipe connection piece 104, wherein a locking element 121 arranged on the inner side of the securing sleeve 118 passes through a through-hole of the outer pipe piece 114 and extends into one of the annular grooves 108. In this way, the quick-action coupling part 112 is fixed in place on the pipe connection piece 104. The pipe connection piece 104 carries, on its end face facing away from the connection flange 102, a seal ring 122 which ensures a liquid-tight connection of the quick-action coupling part 112 to the pipe connection piece 104.

On the side facing away from the pipe connection piece 104, the quick-action coupling part 112 comprises a connection nipple 124 to which can be connected a hydraulic conduit, for example a hydraulic hose.

At a position spaced away from the filter head part 28, the tank housing 12 comprises, at the top wall 16 thereof, a third connection opening 126 through which passes a pipe piece 128 that extends into the interior space 26 of the tank housing 12 and which is, with an end-side radial enlargement 130 thereof, supported on a step of the third connection opening 126. In the exemplary embodiment shown, the pipe piece 128 is manufactured as a one-piece plastic body by an injection moulding process and is, in the area of the radial enlargement 130 thereof, welded together with the tank housing 12 using a laser beam.

Arranged at the third connection opening 126, in line with the pipe piece 128, is a third connection element 132 which is of identical configuration to that of the connection elements 100, 109 and 110 described in the foregoing and likewise comprises a connection flange which is welded together with the tank housing 12 by way of a laser beam. The third connection element 132 can also have connected thereto a hydraulic conduit in a liquid-tight manner by use of a quick-action coupling part 112.

At the first side wall 22, the tank housing 12 comprises further connection openings, at each of which is arranged a connection element 134, 136, 138 and 140 respectively. In the exemplary embodiment as shown, the connection elements 134, 136, 138 and 140 are also manufactured by an injection moulding process as one-piece plastic bodies without a metallic partial component and are welded together with the tank housing 12 by way of a laser beam.

In addition, the first side wall 22 has arranged thereat an oil level indicator 142 which allows the user to read the oil level.

Figure 5:
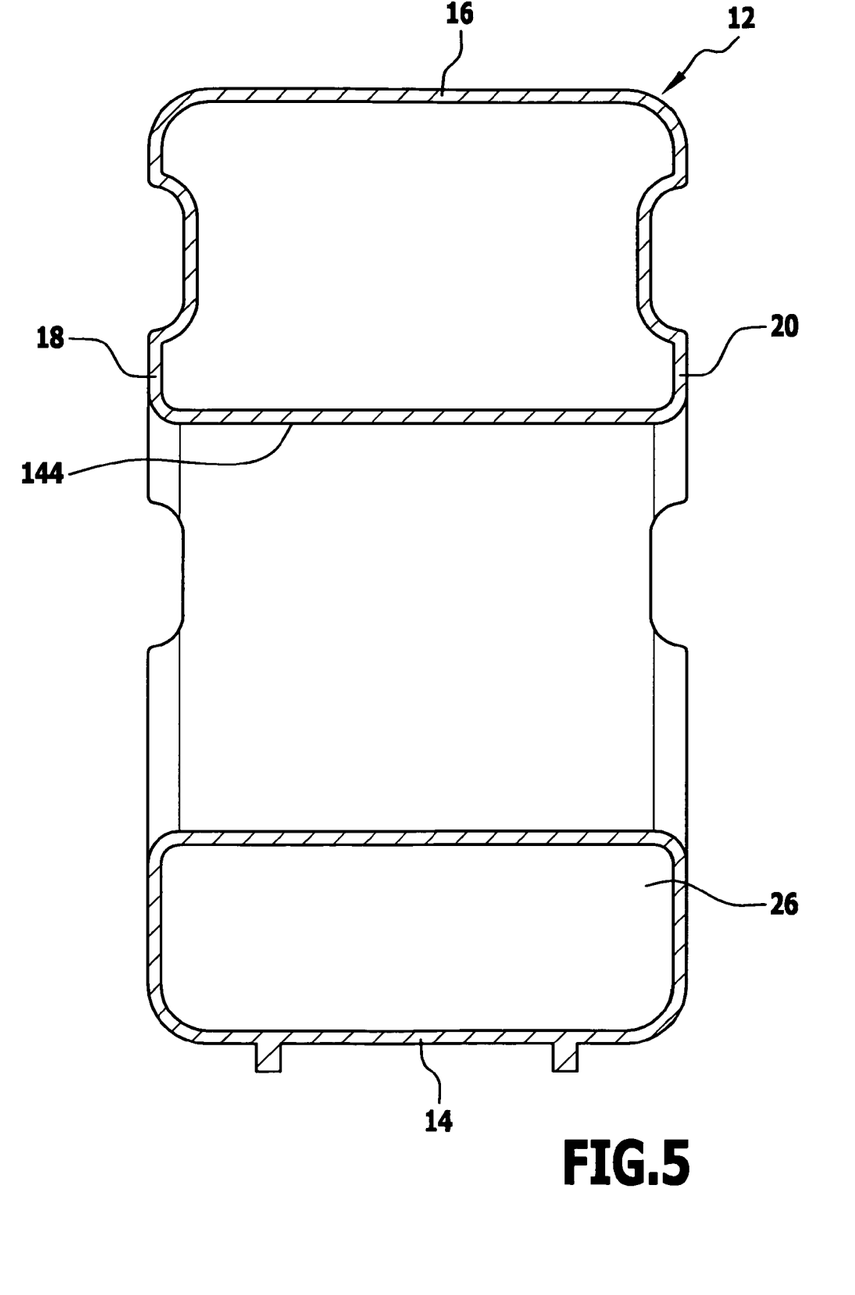
FIG. 5 shows a sectional view of the hydraulic tank along line 5-5 of FIG. 2.
Figure 6:
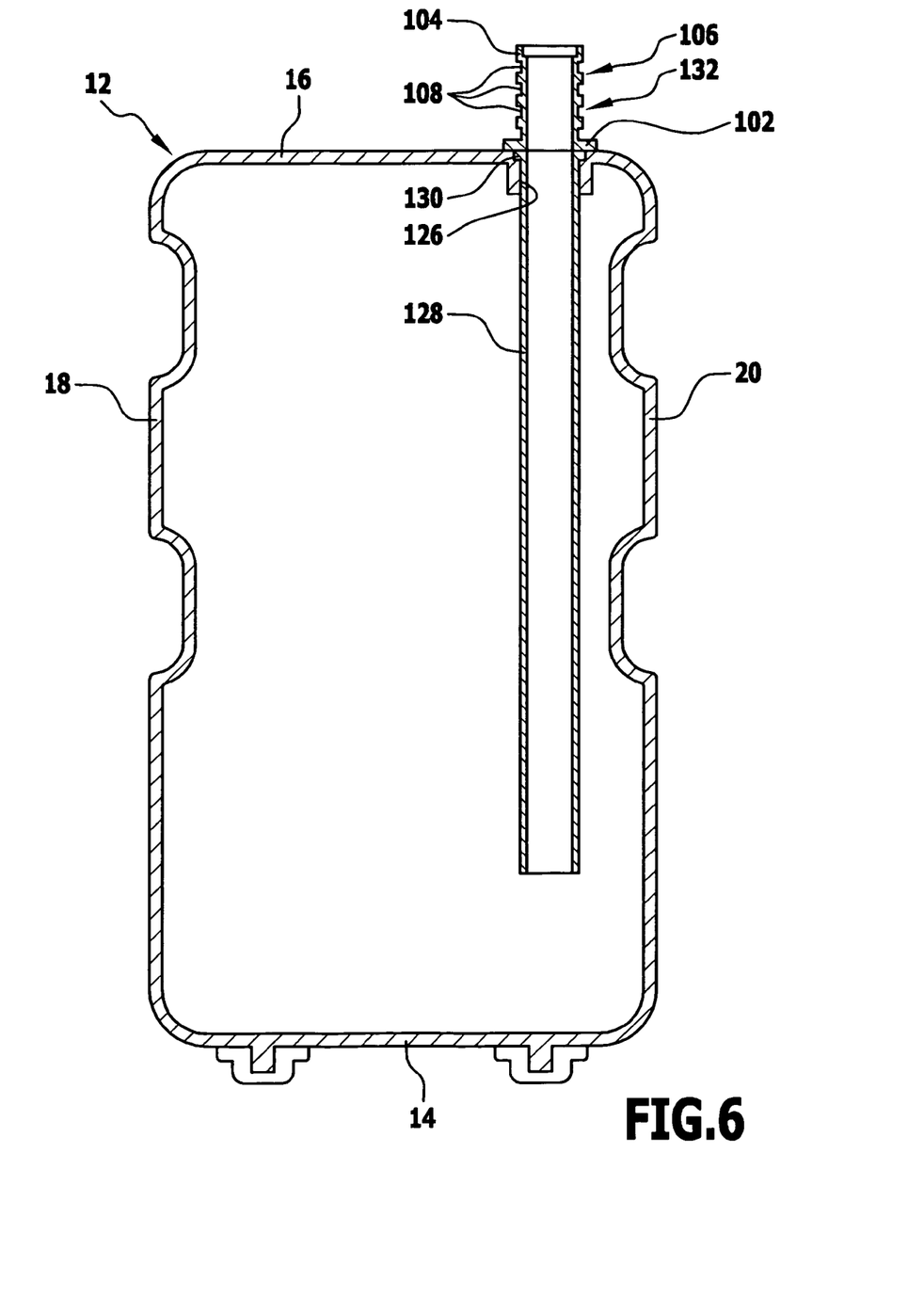
FIG. 6 shows a sectional view of the hydraulic tank along line 6-6 of FIG. 2.

For increasing the mechanical stability, the tank housing 12 forms a first traverse 144 depicted in FIG. 5 and a second traverse 146 arranged in spaced-apart relation to the first traverse 144. The two traverses 144, 146 are of hollow configuration and extend from the front wall 20 to the rear wall 18, thereby imparting high mechanical stability to the tank housing 12. A further mechanical reinforcement of the tank housing 12 is formed by the filter housing 46 which is welded together with the tank housing 12, as has been previously described.

For ventilating and venting the tank housing 12, the latter forms, at the top wall 16 thereof, a ventilation opening 148 at which a ventilation filter 150 is arranged. Integrated in the ventilation filter 150 is a bidirectional valve (not shown in the drawing).

The tank housing can be manufactured in the form of a one-piece plastic hollow body without a metallic partial component, i.e. without metallic insert or reinforcement parts in particular, by a rotational moulding process with relatively low investment costs and ample design freedom and low cost per piece, in particular when compared with metal tanks. The connection elements 100, 109, 110, 132 to 140 welded to the tank housing 12 which are in each case manufactured as one-piece plastic bodies without a metallic partial component by an injection moulding process provide a structurally simple way of connecting hydraulic conduits to corresponding connection openings of the tank housing 12, wherein the connection elements can be manufactured in large numbers of pieces and, therefore, in a cost-effective way. The complete hydraulic tank 10 is distinguished by a very good cost-performance ratio, in particular for small to medium numbers of pieces.

The invention claimed is:

1. A hydraulic tank for storing a hydraulic liquid, comprising:
a one-piece tank housing which forms a plastic hollow body, the one-piece tank housing having at least one connection opening at which is arranged with a connection element that is releasably connectable to a hydraulic conduit, the connection element comprising a plastic body which is welded together with the one-piece tank housing, and the one-piece tank housing having a filter system integrated therein, wherein the one-piece tank housing includes:
a filter access opening which is surrounded by an edge section of the one-piece tank housing, a filter housing disposed in the filter access opening of the one-piece tank housing, the filter housing comprising a plastic body, and a weld integrally connecting the filter housing to the edge section, and a filter element inserted in the filter housing,
the edge section is configured as a support ring arranged in the one-piece tank housing, and
a filter head part on which is arranged the at least one connection opening, the filter head part comprising the edge section surrounding the filter access opening, the at least one connection opening including a first connection opening forming a tank inlet opening of the one-piece tank housing and a second connection opening forming a tank outlet opening of the one-piece tank housing.

2. A hydraulic tank in accordance with claim 1, wherein the plastic body of the connection element is manufactured as a one-piece component.

3. A hydraulic tank in accordance with claim 1, wherein the plastic body of the connection element is configured without a metallic partial component.

4. A hydraulic tank in accordance with claim 1, wherein the one-piece tank housing is formed from a polyamide material.

5. A hydraulic tank in accordance with claim 1, wherein the one-piece tank housing is formed from a fibre-reinforced polyamide material.

6. A hydraulic tank in accordance with claim 1, wherein the connection element includes a pipe connection piece which comprises, on an outer side thereof, a receiving structure for a quick-action coupling part.

7. A hydraulic tank in accordance with claim 1, wherein the filter housing is formed from a fibre-reinforced polyamide material.

8. A hydraulic tank in accordance with claim 1, wherein the filter element comprises an upper end disk and a lower end disk between which a filter medium is arranged, wherein the upper end disk divides, in a liquid-tight manner, an interior space of the filter head part into an inlet space for hydraulic liquid that is to be filtered and an outlet space for hydraulic liquid that has been filtered, wherein the tank inlet opening is open to the inlet space and wherein the tank outlet opening is open to the outlet space.

9. A hydraulic tank in accordance with claim 8, wherein the upper end disk comprises a partition disk oriented obliquely to a longitudinal axis of the filter element, said partition disk being in liquid-tight contact against an inner side of the filter head part.

10. A hydraulic tank in accordance with claim 1, wherein the tank inlet opening and the tank outlet opening are arranged at a same level relative to a longitudinal axis of the filter element.

11. A hydraulic tank in accordance with claim 1, wherein the filter housing includes, at an end section thereof extending into the one-piece tank housing, a receiving space for one or more of an inlet valve and an outlet valve.

12. A hydraulic tank in accordance with claim 1, wherein the filter element is supported on an end section of the filter housing that extends into the one-piece tank housing.

13. A hydraulic tank in accordance with claim 1, wherein the one-piece tank housing includes at least one traverse that extends from a first tank housing wall to an opposite second tank housing wall and the at least one traverse is of hollow configuration.

14. A hydraulic tank in accordance with claim 1, wherein the one-piece tank housing includes a ventilation opening at which a ventilation filter is arranged.

15. A hydraulic tank in accordance with claim 1, wherein a pipe piece extends into the one-piece tank housing, and the pipe piece is held in a connection opening of the at least one connection opening.

16. A hydraulic tank in accordance with claim 15, wherein the pipe piece is welded together with the one-piece tank housing.

* * * * *